March 28, 1967  L. C. NOYES  3,311,303
PROGRAMMER
Filed Sept. 28, 1965  3 Sheets-Sheet 1
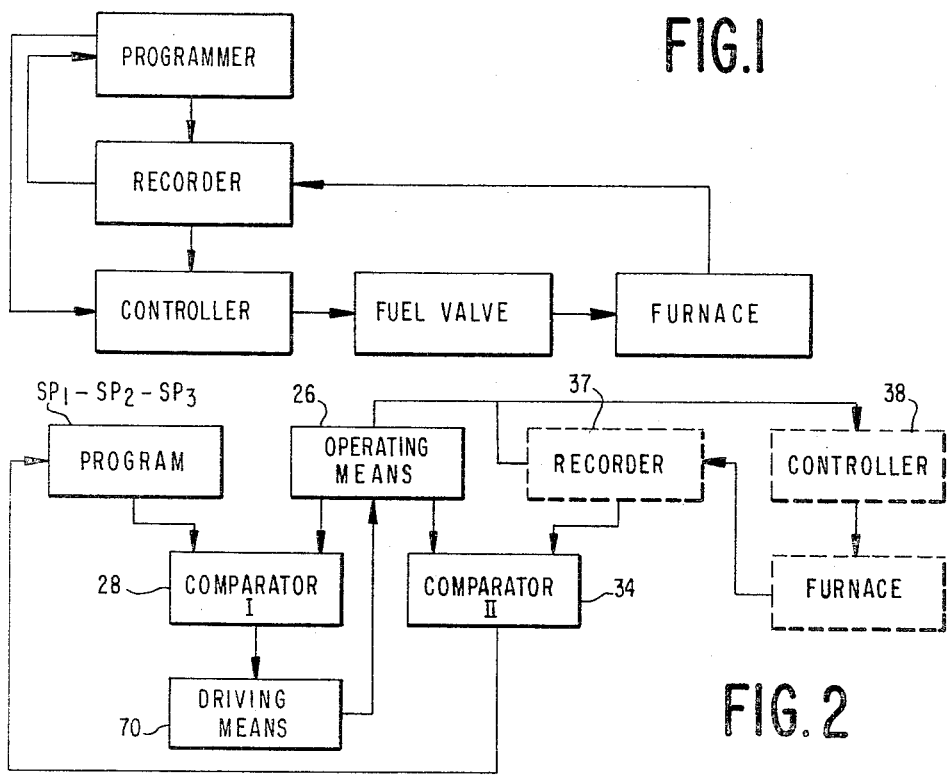
FIG.1
FIG.2
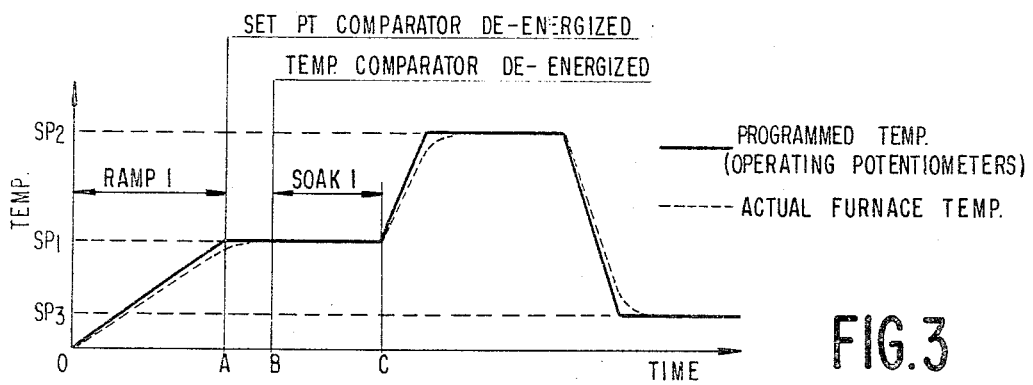
FIG.3
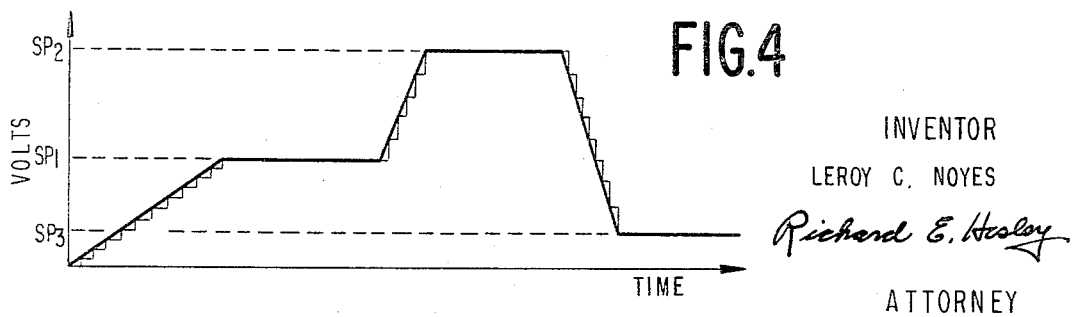
FIG.4
INVENTOR
LEROY C. NOYES
Richard E. Hasley
ATTORNEY

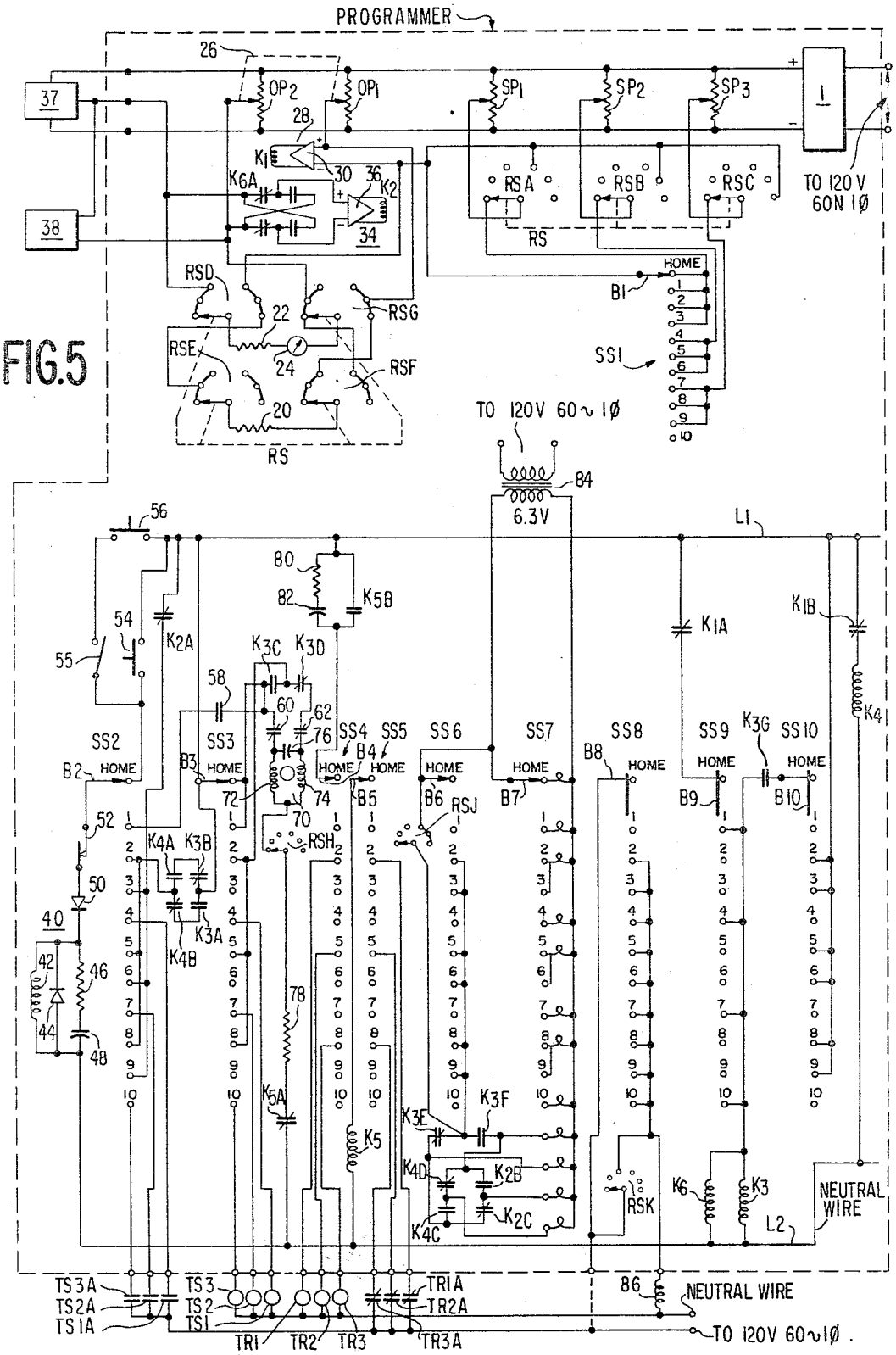

March 28, 1967  L. C. NOYES  3,311,303
PROGRAMMER
Filed Sept. 28, 1965  3 Sheets-Sheet 3
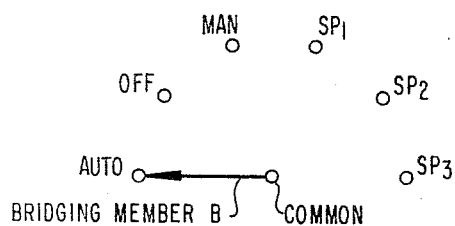
FIG.5a
HOME — END CYCLE
1 — START CYCLE
2 — RAMP 1 (SET PT)
3 — RAMP 1 (TEMP)
4 — SOAK 1
5 — RAMP 2 (SET PT)
6 — RAMP 2 (TEMP)
7 — SOAK 2
8 — RAMP 3 (SET PT)
9 — RAMP 3 (TEMP)
10 — SOAK 3
FIG.5b
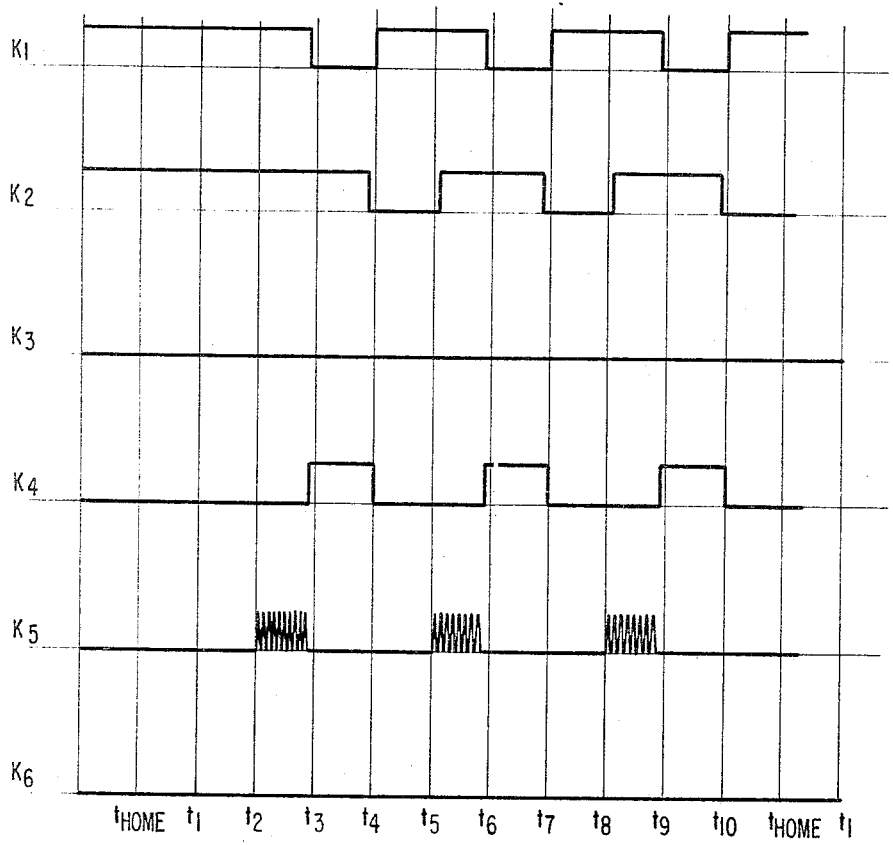

United States Patent Office 3,311,303
Patented Mar. 28, 1967

3,311,303
PROGRAMMER
Leroy C. Noyes, Topsfield, Mass., assignor to General
Electric Company, a corporation of New York
Filed Sept. 28, 1965, Ser. No. 490,993
6 Claims. (Cl. 236—46)

The present invention relates to programmed control systems and more specifically to programmed control systems wherein a plurality of steps are to be completed in a desired sequence and previous steps must be completed prior to initiation of subsequent steps in the program.

In programmed control systems having a plurality of steps to be sequentially completed, it is desirous, if not mandatory, that prior steps be completed before initiation of subsequent steps in the program. One example of such a system is a programmed furnace control wherein the temperature of a furnace is to be maintained at various levels for predetermined time intervals. The furnace temperature is driven to the first level as determined by the program in a substantially ramp function. A ramp function is desirable as this is generally the quickest way of driving the furnace to the desired temperature level without fracturing a device in the furnace due to the unequal heating thereof as a result of too rapid a change in temperature. Upon reaching this first level, the temperature is held there for a predetermined time period. The furnace is then heated or cooled, to the second desired temperature level again as determined by the program and again the furnace temperature is held at that level for a predetermined time period. Thus, it can be seen that in order to ensure precise operation of the program, it is required that each temperature level be reached and maintained for the selected period of time prior to the program initiating a temperature change in the furnace.

Therefore, one object of the present invention is to provide a programmed control system wherein subsequent steps in a program are initiated only after previous steps have reached completion.

Another object of the present invention is to provide an improved programmed furnace control system having a plurality of temperature levels to be successively initiated wherein subsequent temperature levels are initiated only after previous temperature levels are completed.

Briefly, one form of the present invention includes first variable voltage means for generating a signal which is proportional to each of the plurality of condition levels to be sequentially attained by the programmer. There is further included second variable voltage means which in turn is sequentially connected to the first mentioned variable voltage means. Means are provided for driving the second variable voltage means to the signal level of the first variable voltage means which corresponds to the first of the programmed condition levels. At the same time the second variable voltage means is also connected to the means for controlling the condition level in the system so that the system is simultaneously being driven toward the desired first condition level. A first monitoring means is connected between the second variable voltage means and the first variable voltage means and detects when the second variable voltage means arrives at the first condition level and upon arrival thereat, interrupts the driving means. A second monitoring means is connected to the system and detects when the system arrives at the desired first condition level and in response thereto, enables the system to proceed to the subsequent one of the programmed condition levels. If desired, means may be provided for holding the system at the first condition level for a predetermined time interval prior to initiating the start of the system to a subsequent one of the programmed condition levels.

Additional objects and advantages of the present invention together with a better understanding thereof may be had by referring to the following detailed description of a preferred embodiment of the present invention along with the accompanying drawings.

FIGURE 1 is a block diagram of a system which incorporates the present invention.

FIGURE 2 is a block diagram of an embodiment of the programmer which comprises the present invention.

FIGURE 3 is a time-temperature plot of a typical program for a furnace.

FIGURE 4 is a volt-time plot of the program shown in FIGURE 3 showing how the programmer ramp function is created.

FIGURE 5 is a schematic diagram of the embodiment of the programmer shown in FIGURE 2.

FIGURE 5(a) is a diagram of the rotary switch utilized in the programmer of FIGURE 2.

FIGURE 5(b) is a function diagram of the selector switch utilized in the programmer of FIGURE 2.

FIGURE 6 is a time-voltage plot of the energization state of the control relays used in the programmer of FIG. 2.

Referring now to FIGURE 1, there is shown a block diagram of a system which incorporates the present invention; in this case a furnace in which it is desired to control the temperature. This may be done by a series of "ramps" and "soaks" wherein "ramp" is used to designate a time interval when a furnace controller is supplied with a correction signal so as to drive the furnace temperature to a programmed level at a predetermined rate and "soak" is used to designate a time interval subsequent to a "ramp" and during which time interval the temperature of the furnace is held at the desired programmed level. The temperature of the furnace may be taken by means of a thermocouple connected to a recorder or other suitable means which, in turn, is connected to the programmer. A signal from the recorder which is proportional to the furnace temperature, is supplied to the programmer wherein it is compared with a signal in the programmer which is proportional to the programmed temperature level. Any difference between the two signal levels may be shown on a deviation meter on the programmer and also supplied to the controller. The controller may be of the proportional or of the integrating type and is effective to vary the temperature of the furnace consistent with any difference occurring between the two signal levels so as to drive the furnace toward the programmed level. For instance, the controller might open or close a fuel valve to the furnace in order to control the temperature thereof.

Referring now to FIGURES 2 and 5, there is shown a block diagram and a schematic diagram of a programmer in accordance with the present invention. Specifically, the programmer comprises variable voltage means shown as $SP_1$, $SP_2$, and $SP_3$ in FIGURE 5 for each temperature level to be successively reached by the furnace. A signal corresponding to the first of the programmed temperatures as supplied from a predetermined program to a first comparator 28 in which the signal is compared with a feedback signal from an operating means $OP_1$ and $OP_2$ in the programmer. It is desired to have both signals of equal value so that the programmer operating means $OP_1$ and $OP_2$ will reflect the first of the programmed temperature levels. When the two signals are compared, any deviation in the operating means $OP_1$ and $OP_2$ signal from the programmed signal from $SP_1$ is effective to cause the operating means $OP_1$ and $OP_2$ to be driven, by a motor 70 or other suitable means to be described in detail hereinafter, until the two signals are equal. The operating means $OP_1$ and $OP_2$ is also connected to a second comparator 34 used for comparing the signal from the operating means $OP_1$ and $OP_2$ with a feedback signal from the furnace which is proportional to the temperature therein. The second comparator 34 is responsive to any difference occurring between the operating means signal and the temperature signal and precludes initiation of a subsequent step in the program until the furnace reaches the first programmed temperature. When the furnace reaches the first programmed level, the output of second comparator is effective to initiate a subsequent step in the program by causing the second programmed temperature to be connected to the first comparator whereby the programmer is effective to drive the furnace toward the second programmed level. In driving the furnace to the desired programmed level, the signal from the operating means is supplied to the furnace controller together with the signal proportional to the furnace temperature.

Turning now to FIGURE 5 and the schematic diagram of the present invention, there is shown a D.C. power supply 1 and means for connecting the D.C. power supply 1 to an external source of energy. In this particular instance, the external source of energy may comprise a 120 volt, 60 cycle, single phase supply. Connected to the D.C. power supply 1 are variable voltage means which are used for setting the desired temperature levels of the programmer. Specifically, the variable voltage means includes three "set point" slidewire potentiometers $SP_1$, $SP_2$, and $SP_3$ connected across the D.C. power supply with each potentiometer having a movable slider arm thereon. The slider arms of each of these "set point" potentiometers are connected to common contacts on sections RSA, RSB, and RSC, respectively, of a rotary switch RS used to connect the potentiometers in the programmer circuit.

The rotary switch RS, the specific construction of which forms no part of the present invention as such switches are old and well known, comprises a multi-position, multi-sectioned switch in which each section of the switch is itself a separate switch and all sections rotate simultaneously. Each section of the rotary switch RS includes a bridging member which opens or closes an electrical circuit between a common contact on each section of the rotary switch and one of a plurality of spaced fixed contacts thereon. FIGURE 5(a) shows a typical section of the rotary switch RS with the multiple contact positions, the bridging contact B, and the common contact. Further, the following chart briefly describes the various positions of the rotary switch RS.

| Position: | Function |
| --- | --- |
| 1. Auto | Programmer on automatic control. |
| 2. Off | Programmer is off. |
| 3. Manual | Programmer on manual control. |
| 4. $SP_1$ | First set point potentiometer $SP_1$ connected to operating means $OP_1$. |
| 5. $SP_2$ | Second set point potentiometer $SP_2$ connected in like manner to $OP_1$. |
| 6. $SP_3$ | Third set point potentiometer $SP_3$ connected in like manner to $OP_1$. |

In the AUTO position, the rotary switch RS connects RSA to positions HOME and 1–3, RSB to positions 4–6, and RSC to positions 7–9 of one section $SS_1$ of a multi-position, multi-section selector switch SS, the specific construction of which forms no part of the present invention as such switches are old and well known. Generally, rotation of the selector switch SS occurs as the programmer is proceeding through its operations and it successively connects the "set point" potentiometers $SP_1$, $SP_2$, and $SP_3$ into the programmer circuit at appropriate times. The $SP_1$ position of RSA, the $SP_2$ position of RSB, and the $SP_3$ position of RSC of rotary switch RS are all connected to the common contact of $SS_1$. Four other sections RSD, RSE, RSF, and RSG are also included on the rotary switch RS with the AUTO-OFF-MAN positions of each of these sections common as well as the $SP_1$–$SP_2$–$SP_3$ positions being common. These sections, RSD, RSE, RSF, and RSG, are used for connecting the "set point" potentiometers to the operating means of the programmer. Specifically, the common contact of $SS_1$ is connected to the $SP_1$ position of RSD which, in turn, is connected to the OFF position of RSE. Connected between the common contacts of RSE and RSF is a "dummy load" resistor 20. Similarly connected across the common contacts of RSD and RSG is a series network consisting of a voltage dropping resistor 22 and a deviation indicator 24 which may comprise a microammeter having a center null position. The MAN position on RSF is connected to the $SP_3$ position on RSF which, in turn, is connected to the operating means of the programmer.

The operating means 26 of the programmer is used for setting each program level in sequence. The operating means 26 comprises variable voltage means which, in this instance, include two potentiometers $OP_1$ and $OP_2$ each having movable slider arms thereon. The slider arms of each of the operating potentiometers are interconnected for uniform motion and are adapted to be driven by suitable means, such as a motor 70. The slider arm of the first operating potentiometer $OP_1$ is connected to the $SP_2$ position on RSG and also to a means for monitoring and comparing the voltages from the "set point" potentiometers and the operating potentiometer $OP_1$ such that the comparing means is responsive to any voltage difference therebetween.

Specifically, this "set point" comparator 28 includes an amplifier 30 having two input terminals, one of which is connected to the common contact of $SS_1$ and the other of which is connected to the slider arm of operating potentiometer $OP_1$. A relay coil $K_1$ is connected across the amplifier 30. With the terminals of the amplifier 30 having the polarities as shown, the relay coil 32 will become de-energized whenever the plus (+) terminal becomes equal to or slightly more positive than the negative (−) terminal. In the preferred embodiment of the present invention, it can be seen that relay coil 32 de-energizes only when the operating potentiometer $OP_1$ reaches the voltage level of a connected "set point" potentiometer.

The second of the two operating potentiometers $OP_2$ has its slider arm connected through a set of reversing contacts $K_{6A}$, controlled by a relay $K_6$ to be described hereinafter, to one input terminal of a second monitoring and comparing means 34 which is identical with the first comparing means 28. The slider arm of operating potentiometer $OP_2$ is also connected to the OFF position on RSG and to an external controller 38 for the furnace. This second or "temperature" comparator 34 includes an amplifier 36 having a relay $K_2$ connected across the output thereof. Temperature comparator 34 also has two input terminals, the first of which is connected to a recorder 37 from the furnace which produces an electrical signal proportional to the temperature in the furnace and the second of which is connected to the slider arm of operating potentiometer $OP_2$. When the furnace temperature reaches the programmed level, that is, when the voltage from the recorder is equal to the voltage from the slider arm of the operating potentiometer $OP_2$, the input to the temperature comparator 34 becomes zero, thereby de-energizing the relay $K_2$ connected thereacross and enabling the programmer to proceed with the next step in the program.

As previously mentioned, the temperature comparator 34 is connected to the programmer circuit through reversing contacts $K_{6A}$ controlled by a relay $K_6$ to ensure that the same polarity of voltage appears at the comparator input terminals regardless of whether subsequent temperature levels in a program are above or below preceding levels. A program scale (not shown) is connected to the operating potentiometers $OP_1$ and $OP_2$ and is used for both visually setting the desired temperature levels and providing the operator of the programmer with a means for visually determining the "set point" and the deviation of the process from the "set point" at any moment in time.

In setting a program on the programmer, the rotary switch RS is turned to the $SP_1$ position wherein the operating potentiometer $OP_1$ is connected through the deviation meter 24 to the first "set point" potentiometer $SP_1$. The operating potentiometer $OP_1$ is then set to a corresponding value, as is indicated by the program scale (not shown) which value is proportional to the first desired temperature level for the furnace. This setting will produce a given voltage at the slider arm of the operating potentiometer $OP_1$, proportional to the programmed temperature, which is supplied to one side of the deviation meter 24 through RSG. As "set point" potentiometer $SP_1$ is also connected to the deviation meter 24, it is adjusted until there is zero deviation shown on the meter 24 which indicates that the operating potentiometer $OP_1$ and the first "set point" $SP_1$ are at equal voltage levels. Thus, the first programmed temperature level is set on the first "set point" potentiometer $SP_1$.

In like manner, rotary switch RS is rotated to positions $SP_2$ and $SP_3$ and the second and third programmed temperatures are set. It is, of course, understood that if a greater or a smaller number of temperature levels are desired, more or less "set point" potentiometers can be used.

As an alternative to the procedure just discussed, calibrated scales could be provided for the "set points" and thus the above procedure could be eliminated.

Although the operation of the programmer will be described in detail hereinafter, when initiating automatic operation of the programmer the rotary switch RS is in the AUTO position and the selector switch SS in the HOME position. Upon depressing a start button 54, the operating potentiometers $OP_1$ and $OP_2$ are driven to the first programmed level as determined by "set point" potentiometer $SP_1$ by suitable means, in this instance a motor 70. Upon reaching this level, the relay $K_1$ connected across the "set point" comparator 28 becomes de-energized and the contacts controlled thereby move to open the motor energization circuit and thus stop driving the operating potentiometer slider arms. Thus, the operating potentiometer $OP_1$ is at a voltage level proportional to the desired first temperature level in the program.

During the same period of time the second operating potentiometer $OP_2$ is connected to the control means 38 for the furnace together with the signal from the recorder 37 which is proportional to furnace temperature. If a suitable control means such as a General Electric Type 524 3-mode integrating controller is chosen, the difference between the two input signals is used to drive the furnace temperature in the proper direction as by opening or closing the fuel valve to the furnace. With zero difference occurring between the two signals, the fuel valve is held in a position to maintain the furnace temperature at the desired level. Due to a time lag in the system, the programmer may reach the desired "set point" before the furnace arrives at the desired level. This can be seen by referring to FIGURE 3 wherein the solid line shows the movement of the operating potentiometers. This solid line also reflects the idealized movement of the furnace temperature. Under an ideal situation, the furnace temperature would follow exactly the operating potentiometer curve; however, due to the furnace design, heat losses therein, and other practical considerations, the actual plot of the furnace temperature follows the dashed lines of FIGURE 3. Thus, it can be seen that the programmer will arrive at the "set point" before the furnace arrives at the desired level. Alternatively, the dashed lines could also represent the temperature of the object in the furnace which, in most instances, lags slightly behind the furnace temperature.

When the furnace reaches the desired first program level, the relay $K_2$ connected across amplifier 36 becomes de-energized at which time the programmer may initiate a second programmed temperature. Generally, a timer is added and the furnace held at the first programmed temperature level for a predetermined time period before the second programmed temperature is initiated. Again, referring to FIGURE 3, if a program is initiated at the time $t=0$, it can be seen that the programmer arrives at the first "set point" at time $t=A$, the furnace arrives at the desired level at time $t=B$ and between the time $t=B$ and time $t=C$, the furnace is held at the desired temperature level. At the time $t=C$, the programmer is effective to initiate the second of the predetermined sequence of temperatures by disconnecting the first "set point" potentiometer $SP_1$ from the operating potentiometers $OP_1$ and $OP_2$ and connecting the second "set point" potentiometer $SP_2$ thereto with the abovementioned procedure being repeated.

Turning now to the specific construction of the selector switch SS and the remainder of the programmer circuitry, the selector switch SS is basically a multi-position, multi-section switch having the corresponding position as shown in FIGURE 5(b). The selector switch SS is controlled by a solenoid 40 which, upon energization thereof, is effective to cause rotation of the selector switch. Specifically, the solenoid 40 includes a coil 42 in paralled with a rectifier 44 to prevent arcing of a set of interrupter contacts 52. Also connected in parallel with the solenoid is a series circuit comprising a resistor 46 and capacitor 48 which is used to prevent transient operation of the solenoid 40. This parallel combination is connected through a second oppositely poled rectifier 50 and through the solenoid interrupter contacts 52 to the common contact of section $SS_2$ of the selector switch SS. In the operation of the solenoid 40, the coil 42 is energized by supplying it with line voltage from $L_1$ thus causing the solenoid armature (not shown) to strike the interrupter contacts 52 causing them to open. This open circuits the line voltage being supplied to the coil 42, and a spring biased ratchet and pawl arrangement (also not shown) rotates the selector switch SS to a subsequent position. The START switch 54 is connected between the line voltage $L_1$ and the HOME position of $SS_2$. A RESET switch 56, which includes a series connected OFF NORMAL contact 55, is also connected between the line voltage $L_1$ and the HOME position of $SS_2$. The OFF NORMAL contact 55 is open only when $SS_2$ is in the HOME position and for all other positions of $SS_2$, the OFF NORMAL contact 55 is closed. When actuated, the RESET switch 56 returns the selector switch SS to the HOME position by continuing to supply power to the solenoid 40 until the bridging contact $B_2$ for $SS_2$ returns to the HOME position.

The various sections of the selector switch SS control a plurality of circuits in the programmer, and the following discussion relates the various sections of the selector switch, positions thereon and function in the programmer circuitry.

Specifically, section $SS_2$ is used for controlling the energization of the solenoid 40 and thus rotation of the selector switch SS. The number 1 position of $SS_2$ is connected through a normally open limit switch 58 to the HOME position on $SS_3$. The normally open limit switch 58 is adapted to be actuated by a cam (not shown) on the shaft of the operating potentiometer $OP_1$. With limit switch 58 closed and the selector switch SS in the HOME or 1 position, line voltage is supplied via the common contact on $SS_3$ through the bridging contact $B_3$ and through the HOME or 1 position of $SS_3$ to position 1 of $SS_2$. With line voltage on position 1 of $SS_2$ and the bridging contact $B_2$ of $SS_2$ connected to position 1, the solenoid coil 42 is energized and the selector switch SS rotated to a subsequent position.

Position 2 of $SS_2$ is connected to the junction of a set of normally open contacts $K_{4A}$ and a set of normally closed contacts $K_{4B}$ of a control relay $K_4$. The set of normally closed contacts $K_{4B}$ from control relay $K_4$ is connected through a set of normally open contacts $K_{3A}$ of control relay $K_3$ to the source of line voltage $L_1$ and likewise the set of normally open contacts $K_{4A}$ of control relay $K_4$ are connected through a set of normally closed contacts $K_{3B}$ of control relay $K_3$ to the source of line voltage $L_1$. As the junction of the contacts of $K_{3A}$ and $K_{3B}$ is connected to the line voltage $L_1$, selective energization of the control relays $K_3$ and $K_4$ causes line voltage to be supplied to the solenoid 40 and thereby causes rotation of the selector switch SS.

Position 3 of section $SS_2$ of the selector switch is connected through a set of normally closed contacts $K_{2A}$ of temperature comparator relay $K_2$ and upon the furnace reaching its predetermined programmed level, the relay $K_2$ is de-energized and line voltage is supplied to the selector switch solenoid 40.

Position 4 of $SS_2$ is connected through a set of normally open contacts $TS_{1A}$ of a first "soak" timer $TS_1$ to the source line voltage and is effective to supply line voltage of the selector switch solenoid 40 after a predetermined time interval as determined by the timer $TS_1$ has passed.

Position 5 of $SS_2$ is jumpered to position 2, as is position 8, and is effective to rotate the selector switch when the "set point" comparator relay $K_1$ again becomes de-energized, i.e., when the second, and third, "set point" is reached. The number 6 and number 9 positions of $SS_2$ are jumpered to the number 3 position of $SS_2$ and are effective to cause rotation of the selector switch when the furnace has reached its second and third programmed levels. Positions 7 and 10 are connected through sets of normally opened contacts $TS_{2A}$ and $TS_{3A}$ controlled by soak timers $TS_2$ and $TS_3$ for the second and third program levels and are effective to rotate the selector switch SS at the end of the second and thrid programmed cycles.

At the termination of the third programmed cycle, that is, when soak timer $TS_3$ has timed its cycle, normally open contacts $TS_{3A}$ close and line voltage is supplied to the solenoid 40 to rotate the selector switch $SS_2$ to the HOME position at which point the program is completed.

Referring now to section $SS_3$ of the selector switch, the common contact thereof is connected to the line voltage $L_1$ and the HOME and number 1 positions thereof are both connected to one side of a set of normally open contacts $K_{3C}$ of control relay $K_3$ and also to the other side of the limit switch 58, as previously discussed.

Positions 2, 5, and 8 are common and are connected to the means for driving the operating potentiometers. Specifically, the means for driving the operating potentiometers $OP_1$ and $OP_2$ includes a synchronous motor 70 having first field winding 72 for driving the motor in one direction and a second field winding 74 for driving the motor in the opposite direction. The motor shaft is connected through suitable gearing means (not shown) to the slider arms of the operating potentiometers $OP_1$ and $OP_2$ and moves the slider arms across the surface of the potentiometer to vary the output voltage accordingly. A capacitor 76 is connected across the two windings to ensure proper operation of the synchronous motor. Field winding 72 is connected through a normally closed lower limit switch 60 and through a set of normally open contacts $K_{3C}$ of control relay $K_3$ to the number 2 position of $SS_3$. Similarly, field winding 74 is connected through a normally closed upper limit switch 62 and through a set of normally closed contacts $K_{3D}$ of control relay $K_3$ to the number 2 position of $SS_3$. The normally closed lower limit switch 60 is actuated by a cam on the shaft of the operating potentiometers and prevents field winding 72 from driving the operating potentiometers $OP_1$ and $OP_2$ beyond a lower limit of travel. Similarly, the normally closed upper limit switch 62 prevents overtarvel of the operating potentiometers $OP_1$ and $OP_2$ at their upper limit.

When field winding 72 is energized, that is, when the field in winding 72 is leading the field in winding 74, the synchronous motor 70 drives the slider arms of the operating potentiometers $OP_1$ and $OP_2$ to their lower levels on the potentiometer whereas when field winding 74 is energized, when the field in winding 72 is lagging the field in winding 74, the slider arms of the potentiometers are driven to their higher levels.

The junction of the field windings 72 and 74 is connected to the AUTO position of still another section RSH of the rotary switch RS. The common contact of RSH is connected through a current limiting resistor 78 and through a series connected normally closed contact $K_{5A}$ from a time delay relay $K_{51}$, to be described later, to the neutral line 62 of the programmer.

As previously mentioned, it has been found desirable to drive the slider arms of the operating potentiometers $OP_1$ and $OP_2$ to their "set point" levels in a substantially ramp function. The means for accomplishing the ramp function generation are controlled by sections $SS_4$ and $SS_5$ of the selector switch. As the motor 70 is generally of the synchronous type, it is impossible to have a direct ramp function generated; therefore, time delay means must be incorporated into the motor circuit to periodically interrupt the motor field circuit in order to generate a ramp function movement of the slider arm of the operating potentiometers.

Specifically, the common contact of $SS_4$ is connected through a normally open contact $K_{5B}$ controlled by time delay relay $K_5$ to the line voltage. In parallel with the normally open contact $K_{5B}$ is an RC series circuit comprising a resistor 80 and a capacitor 82 which prevent arcing of the contacts $K_{5B}$ as they open and close. The number 2 position of $SS_4$ is connected through a first ramp timer $TR_1$ to the neutral wire $L_2$ and upon energization of the time delay relay $K_5$ to the contact $K_{5B}$ closes to energize the timer $TR_1$ for the first ramp. Similarly, positions 5 and 8 of $SS_4$ are connected through ramp timers $TR_2$ and $TR_3$, respectively, to the neutral wire $L_2$ and provide the time delay for the generation of the ramps for the second and third programmed temperature levels.

Turning now to $SS_5$, its common contact is connected through the time delay relay $K_5$ to the neutral wire $L_2$. The number 2 position of $SS_5$ is connected through a set of normally closed contacts $TR_{1A}$ controlled by timer $TR_1$ to the line voltage $L_1$. After the timer $TR_1$ is energized and has provided its predetermined time delay, the normally closed contacts $TR_{1A}$ will open, thus de-energizing time delay relay $K_5$. In like manner, position 5 of $SS_5$ is connected through normally closed contacts $TR_{2A}$ controlled by timer $TR_2$ to the line voltage $L_1$, and position 8 is connected through normally closed contact $TR_{3A}$ controlled by timer $TR_3$ to the line voltage $L_1$.

In the operation of the ramp generating circuit, with the selector switch SS on the number 2 position, as that is the position when the slider arms of the operating potentiometers $OP_1$ and $OP_2$ are being driven toward the first "set point" level, line voltage is supplied to the synchronous motor, field winding 74 in this instance as the programmer usually starts from the lowest possible level, and the winding is energized because time delay relay contact $K_{5A}$ is closed. At this particular moment in time, the time delay relay $K_5$ becomes energized as a circuit is completed through position 2 on $SS_5$ and normally closed contact $TR_{1A}$ to the line voltage. After the predetermined time delay, contacts $K_{5A}$ open to de-energize field winding 74 and contacts $K_{5B}$ close to energize ramp timer $TR_1$. When ramp timer $TR_1$ cycles, its contacts $TR_{1A}$ open to de-energize time delay relay $K_5$ which causes contacts $K_{5A}$ to close and again energize field winding 74 and also causes contacts $K_{5B}$ to open to de-energize the ramp timer $TR_1$. Note that time delay relay $K_5$ as well as the ramp timers $TR_1$, $TR_2$, and $TR_3$ may have variable time settings thereon so that any degree of ramp slope can be generated for reaching any particular program level. After time delay relay $K_5$ becomes re-energized and cycles, its contacts $K_{5A}$ open to again de-energize field winding 74 and contacts $K_{5B}$ close to again energize ramp timer $TR_1$. The cycle is repeated until the slider arms of operating poetntiometers $OP_1$ and $OP_2$ reach the programmed "set point" at which time relay $K_1$ becomes de-energized and the programmer proceeds with its next step. As can be seen from FIGURE 4, the ramp is generated in small sequential steps. Also, by using two timers for generating a ramp, a constant energization time for the motor is attained, even for varying ramps.

Sections $SS_6$ and $SS_7$ of the selector switch, along with section RSJ of the rotary switch, combine to provide circuits for controlling a visual indication system of the programmer whereby an operator of the programmer can tell at a glance the position of the programmer as a particular program is being carried out. The indication system includes lamps in the panel of the programmer which are lighted to show the exact status of the programmer during its operation.

A 6.3 volt tap 84 is taken from the line voltage $L_1$ and supplied to the common contacts of $SS_6$ and $SS_7$. The common contact of $SS_6$ is connected to the $SP_1$–$SP_2$–$SP_3$ jumpered sections of RSJ. Positions 2, 3, 5, 6, 8, and 9 of $SS_6$ are common and are connected to the common contact of RSJ and also the junction between a set of normally closed contacts $K_{3E}$ and a set of normally open contacts $K_{3F}$ of control relay $K_3$. The other side of the normally open contacts $K_{3F}$ is connected through a COOL lamp to the other side of the 6.3 volt supply, and upon the energization of relay $K_3$, the COOL lamp is lighted to indicate that the programmer is proceeding to a "set point" which has a value lower than the previous "set point." The other side of the normally open contacts $K_{3F}$ is also connected to the junction of normally closed contacts $K_{4D}$ controlled by relay $K_4$ and normally closed contacts $K_{2B}$ controlled by temperature relay $K_2$. The other side of the normally closed contacts $K_{3E}$ is connected through a HEAT lamp to the other side of the 6.3 volt supply and is also connected to the junction of normally open contacts $K_{4C}$ and normally open contacts $K_{2C}$. The other side of normally open contacts $K_{4C}$ is joined to the other side of normally closed contacts $K_{4D}$ and also connected through a "SET POINT" lamp to the other side of the 6.3 volt supply. The other side of normally open contacts $K_{2C}$ is connected to the other side of normally closed contacts $K_{2B}$.

The HOME position of $SS_7$ is connected through an "END CYCLE" lamp to a common line which common line is connected to the other side of the 6.3 volt supply. Similarly, position 1 is connected through a "START CYCLE" lamp to the common line, position 2 connected through a "RAMP 1" lamp to the common line, position 3 jumpered to position 2, position 4 connected through a "SOAK 1" lamp to the common line, position 5 connected through a "RAMP 2" lamp to the common line, position 6 jumpered to position 5, position 7 connected through a "SOAK 2" lamp to the common line, position 8 connected through a "RAMP 3" lamp to the common line, position 9 pumpered to position 8, and position 10 connected through a "SOAK 3" lamp to the common line.

As the programmer proceeds through its operations, the relays $K_1$–$K_6$ are energized, whereby contacts controlled thereby are opened and closed; and thus, appropriate lamps connected to $SS_7$ and controlled by the switching of $SS_6$ and $SS_7$ will be lighted to indicate the exact condition of the programmer.

Means are also provided in the programmer for preventing power from being supplied to the load, in this instance the furnace, until the selector switch SS is rotated to the number 2 position, which is the time at which the operating potenitometers are started to the first "set point" level. This is accomplished by jumpering positions 2 through 10 of $SS_8$ and connecting them through a coil 86 to the neutral wire. The common position of $SS_8$ is connected to the line voitage and thus, power cannot be supplied to the load unless the programmer is in either the AUTO position with the selector switch in the number 2 position, or the programmer is in MANUAL position.

Means are also provided in the programmer which permit the programmer to operate when a second or any subsequent temperature levels in a program are lower than the previous temperature levels. This necessitates driving the synchronous motor 70 in the opposite direction so as to drive the operating potentiometers downward as well as reversing the input on the amplifier 36. The means provided for accomplishing this are controlled by sections $SS_9$ and $SS_{10}$ of the selector switch SS and include a first set of normally closed contacts $K_{1A}$ responsive to "set point" relay $K_1$. The 1, 4, 7, and 10 positions of $SS_9$ are common and are connected through a pair of parallel connected relay coils $K_3$ and $K_6$ to the neutral wire. The other side of relay contacts $K_{1A}$ is connected to the line voltage. The first position on $SS_9$ is also connected through a normally open contact $K_{3G}$, controlled by relay $K_3$, to the common contact on $SS_{10}$. The 2, 3, 5, 6, 8, and 9 positions on $SS_{10}$ are all common and are connected to the line voltage. Note that the bridging contacts $B_8$, $B_9$, and $B_{10}$ on $SS_8$, $SS_9$, and $SS_{10}$ are all of the make before break type; that is, a circuit is made to a subsequent position on the switch before the previous circuit is interrupted.

In the operation of the circuits controlled by $SS_9$ and $SS_{10}$, when "set point" relay $K_1$ becomes de-energized, the normally closed contact $K_{1A}$ closes and the line voltage is supplied to the common terminal of $SS_9$. If a subsequent programmed level is lower than the previous setting of the operating potentiometers during the rotation of the selector switch SS, the relays $K_3$ and $K_6$ will be energized and the contacts controlled thereby actuated to reverse the polarity of the input on amplifier 36. Note that when the switch rotates from the number 4 to the number 5 position, relay coil $K_3$ is locked in through its contact $K_{3G}$ and position 5 of $SS_{10}$. This is due to make before break nature of the bridging contacts $B_9$ and $B_{10}$ on $SS_9$ and $SS_{10}$.

A further relay coil $K_4$ which, as previously mentioned, is used in controlling the supply of voltage to the selector switch solenoid 40 and controlling the panel light arrangement of section $SS_7$, is connected through a normally closed contact $K_{1B}$ controlled by "set point" relay $K_1$ to the line voltage and has its opposite end connected to the neutral wire. When the "set point" relay $K_1$ becomes energized, relay $K_4$ becomes energized as the normally closed contacts $K_{1B}$ return to their original closed position.

Turning now to FIGURE 6 and the operation of the programmer, it can be seen that the operation of the programmer is most easily discussed by referring to the operation of the various control relays $K_1$–$K_6$.

Assuming that the three desired temperature levels are "programmed" on "set point" potentiometers $SP_1$, $SP_2$, and $SP_3$, and the selector switch SS is in the HOME position, the start button 54 is depressed whereby the solenoid coil 42 is energized and the selector switch SS is rotated to the number 1 position. In this position the "set point" relay $K_1$ and temperature relay $K_2$ remain energized as operating potentiometer $OP_1$ has not reached the voltage level of "set point" potentiometer $SP_1$ nor has the furnace temperature reached its predetermined first level. Thus, a voltage appears at the input to amplifiers 30 and 36 to maintain the relays $K_1$ and $K_2$ energized. No other relay in the cricuit is energized, and the field winding 72 is energized through the common contact $SS_3$, the bridging contact $B_3$, the number 1 position of $SS_3$, the normally closed contact 60, the field winding 72, the current limiting resistor 78, and the normally closed relay contact $K_{5A}$ to drive the operating means $OP_1$ and $OP_2$ and the programmed scale down to their lowest level. When reaching the lowest point, a cam on the operating potentiometer shaft closes lower limit switch 58 whereby line voltage from $L_1$ is supplied to position 1 of $SS_2$ to energize selector switch solenoid 40 and rotate the selector switch SS to the number 2 position.

In the number 2 position, "set point" relay $K_1$ and temperature relay $K_2$ remain energized as a negative input still occurs at the inputs to the amplifiers 30 and 36. Also, field winding 74 is energized through bridging contact $B_3$, position 2 of $SS_2$, normally closed contact $K_{3D}$, normally closed limit switch 62, field winding 74, current limiting resistor 78, and normally closed contact $K_{5B}$ to the other side of the neutral line $L_2$. During this period of time, time delay relay $K_5$ along with ramp 1 timer $TR_1$ are effective, as previously discussed, to periodically interrupt the operation of the synchronous motor 70 so that the operating potentiometers $OP_1$ and $OP_2$ are driven to the first "set point" level in a substantially ramp function. A brief reference to FIGURES 6 and 4 shows the periodic interruption of the time delay relay $K_5$ and the resultant ramp generated.

At some point later in time, the operating potentiometers $OP_1$ and $OP_2$ will finally be driven to the "set point" level at which time "set point" relay $K_1$ de-energizes as operating potentiometer $OP_1$ has reached the voltage level of the "set point" potentiometer $SP_1$ and there no longer occurs a voltage input amplifier 30; thus, the relay $K_1$ is de-energized. When "set point" relay $K_1$ de-energizes, contacts $K_{1B}$ close and relay $K_4$ is energized directly from the line voltage $L_1$. As control relay $K_4$ is energized, its contacts $K_{4A}$ and $K_{4B}$ are actuated and line voltage is supplied to position 2 of $SS_2$ to again energize the selector switch solenoid 40 to cause rotation of the selector switch to position 3.

In the number 3 position, the operating potentiometers $OP_1$ and $OP_2$ have already reached their desired "set point" levels. During this period of time, correction is still being made by the controller 38 to the furnace in order to bring the furnace to the desired temperature level. When the furnace reaches the desired programmed temperature level, temperature relay $K_2$ de-energizes as the amplifier 36 has identical characteristics to amplifier 30 and there no longer appears at the input terminals to amplifier 36 a voltage differential which will maintain relay $K_2$ energized. When $K_2$ de-energizes, relay contacts $K_{2A}$ close to supply line voltage from $L_1$ to the number 3 position of the selector switch $SS_2$ to again cause energization of the selector switch solenoid 40 and rotation of the selector switch to the number 4 position.

When the selector switch is rotated to the number 4 position, "set point" relay $K_1$ again becomes energized as the second programmed temperature, as determined by the setting of "set point" potentiometer $SP_2$, is connected to the input of the "set point" comparator 28. Also, control relay $K_4$ becomes de-energized due to the energization of "set point" relay $K_1$.

In the number 4 position, the first soak timer $TS_1$ is enrgized and the first holding period for the first programmed temperature is begun. When the soak timer $TS_1$ times out, its normally opened contacts $TS_{1A}$ close to supply line voltage to the number 4 position on $SS_2$ to again cause rotation of the selector switch to the number 5 position.

In the number 5 position, the synchronous motor 70 is again energized and begins to drive the operating potentiometers to the second "set point" level as determined by the setting of potentiometer $SP_2$. When the operating potentiometers $OP_1$ and $OP_2$ are driven in this direction, the temperature relay across temperature comparator 34 again becomes energized due to the difference on the input to the amplifier 36. Time delay relay $K_5$ and ramp timer $TR_2$ combine to periodically interrupt the operation of the synchronous motor 70 to thus produce the second ramp. When the operating potentiometers $OP_1$ and $OP_2$ arrive at the desired second "set point" level, "set point" relay $K_1$ again becomes de-energized and again control relay $K_4$ becomes energized to cause rotation of the selector switch $SS_2$ to the number 6 position.

In the number 6 position, the furnace is still being driven to the second "set point" level and upon reaching this level, temperature relay $K_2$ becomes de-energized, as previously mentioned, to again close its contact $K_{2A}$ to supply line voltage to position 6 of $SS_2$ to cause rotation to the number 7 position.

In position 7, the "set point" relay $K_1$ becomes energized due to the switching of the "set point" potentiometer $SP_3$ to the input of the "set point" comparator 28. Temperature relay $K_2$ remains de-energized and control relay $K_4$ becomes de-energized with the energization of "set point" relay $K_1$. Soak timer $TS_2$ becomes energized and upon timing out, the contacts $TS_{2A}$ close to supply line voltage to position 7 of $SS_2$ and cause rotation of the selector switch to position 8.

In the manner described above, the third programmed "set point" is reached and after soak timer $TS_3$ closes its contacts in response to the end of the soak period, the selector switch is rotated back to the original HOME position.

Although not specifically described during the operation of the programmer, it can be seen that as the selector switch SS rotates through its various positions and the relay $K_2$, $K_3$, and $K_4$ are energized at some time during the operation of the programmer, the various lamps as indicated on $SS_7$ will be lighted and thus the operator of the programmer can tell at a glance the status of the programmer in carrying out the program.

Thus, it can be seen that the programmer just described provides a controller wherein a plurality of desired "set points" are to be successively reached wherein subsequent "set points" are not initiated until prior "set points" are reached. Further, these "set points" are reached in a substantially ramp function which permits the fastest rate of change of temperature without fracturing the material in the furnace due to unequal heating which results from too rapid a change in temperature.

Again, by using two separate timers for generating the ramp, a fixed "on" time for the synchronous motor can be attained which results in a greater range of available ramps with minimum disturbance to the control of the process.

Also, if desired, the ramp at any point in time can be held up until the system condition catches up with it. This can be done by interlocking the temperature alarm amplifier 36 with the motor power circuit. Thus, whenever the temperature in the furnace falls too far behind the corresponding temperature as determined by a ramp, the ramp is interrupted until the furnace temperature gets to within the predetermined set limits at which time the ramp is resumed.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. In a programmed control system for driving the system to successive condition levels in a predetermined sequence, a programmer comprising:
(a) first variable voltage means for generating signals proportional to each of a plurality of condition levels to be successively reached by the programmer,
(b) second variable voltage means sequentially connected to said first variable voltage signal generating means, (c) means connected to said second variable voltage means for driving said second variable voltage means to a signal level of said first variable voltage signal generating means corresponding to the first of the programmed condition levels, (d) means for connecting said second variable voltage means to means for controlling the condition level of the system to drive the system to the first of the programmed condition levels as the second variable voltage means is driven to the signal level corresponding to the first programmed condition level, (e) means for detecting when said second variable voltage means arrives at the signal level of the first variable voltage signal generating means corresponding to the first programmed condition level and interrupting said driving means in response thereto, (f) means for detecting when the system arrives at the desired first condition level for initiating a subsequent one of the programmed condition levels such that initiation is precluded until the first condition level is reached by the system.

2. A programmer as described in claim 1 further including means for maintaining the system at the first condition level for a predetermined time interval prior to initiating the start of the system to a subsequent one of said programmed condition levels.

3. A programmer as described in claim 1 wherein said driving means drives said variable voltage means to the signal level corresponding to the first of the programmed condition levels in a substantially ramp function.

4. A programmer as described in claim 3 wherein said driving means includes:

(a) a reversible synchronous motor connected to said second variable voltage means, and (b) timer means connected to said synchronous motor for periodically interrupting operation of said motor so that said second variable voltage means is driven in a substantially ramp function.

5. A programmer as described in claim 4 wherein said timer means includes:

(a) a first timer for periodically interrupting operation of said synchronous motor, and (b) a second timer for periodically interrupting operation of said first timer.

6. In a programmed control system for driving the system to successive condition levels in a predetermined sequence, a programmer comprising:

(a) a plurality of potentiometers each having an output corresponding to one of the condition levels to be reached by the system, (b) second potentiometer means successively connected to each of said plurality of potentiometers, (c) means for connecting said second potentiometer means to the output of the one of said plurality of potentiometers corresponding to the first condition level to be reached by the system, (d) a synchronous motor connected to said second potentiometer means for driving said second potentiometer means to the output level of the potentiometer of the one of the plurality of potentiometers corresponding to the first condition level to be reached by the system, (e) timer means connected to said synchronous motor for periodically interrupting operation of said synchronous motor so that said second potentiometer means are driven to the output of the one of the plurality of potentiometers corresponding to the first condition level to be reached by the system in a substantially ramp function, (f) means for connecting said second potentiometer means to means for controlling the condition level of the system so as to drive the system to the first of the programmed condition levels as said second potentiometer means is driven to the output level of the first of said plurality of potentiometers, (g) means for detecting when said second potentiometer means arrives at the output of the first of said plurality of potentiometers to interrupt operation of said synchronous motor, and (h) means for detecting when the system arrives at the first desired condition level for initiating a subsequent one of the programmed condition levels such that initiation is precluded until the first condition level is reached whereby the above-mentioned procedure is repeated for each condition level to be reached by the system.

References Cited by the Examiner

UNITED STATES PATENTS

| | | | |
|---|---|---|---|
| 2,118,642 | 5/1938 | Flynn | 236—46 |
| 2,250,899 | 7/1941 | Young | 236—46 |
| 2,409,136 | 10/1946 | Lilja | 236—46 |
| 2,593,562 | 4/1952 | Hornfeck | 236—46 |
| 2,701,292 | 2/1955 | Lincoln | 236—46 |
| 2,972,447 | 2/1961 | White | 236—46 |
| 3,043,517 | 7/1962 | Hanna | 236—46 |

WILLIAM J. WYE, *Primary Examiner.*